(12) United States Patent
Wade et al.

(10) Patent No.: US 7,232,312 B2
(45) Date of Patent: Jun. 19, 2007

(54) ROTARY CONNECTOR HAVING AN INTEGRAL FUSE

(75) Inventors: Jere Wade, Swartz Creek, MI (US); Tomoyuki Yamai, Farmington Hills, MI (US); Kosuke Yamawaki, Chiyoda-ku (JP)

(73) Assignees: The Furukawa Electric Co., Ltd., Tokyo (JP); Furukawa Electric North America, APD, Inc., Plymouth, MI (US)

( * ) Notice: Subject to any disclaimer, the term of this patent is extended or adjusted under 35 U.S.C. 154(b) by 0 days.

(21) Appl. No.: 10/823,589

(22) Filed: Apr. 14, 2004

(65) Prior Publication Data

US 2004/0209505 A1 Oct. 21, 2004

Related U.S. Application Data

(60) Provisional application No. 60/463,031, filed on Apr. 16, 2003.

(51) Int. Cl.
*H01R 39/00* (2006.01)
(52) U.S. Cl. .......................................... 439/4; 439/501
(58) Field of Classification Search ................... 439/4, 439/15, 164, 501
See application file for complete search history.

(56) References Cited

U.S. PATENT DOCUMENTS 5,310,356 A * 5/1994 Obata et al. ................. 439/169
5,690,198 A * 11/1997 Lohr ...................... 191/12.2 R
5,882,216 A * 3/1999 Matsumoto et al. ......... 439/164
5,944,544 A * 8/1999 Kuroda et al. .............. 439/164
6,007,355 A * 12/1999 Shibata et al. .............. 439/164
6,222,142 B1 * 4/2001 Sano ....................... 200/61.54
6,299,466 B1   10/2001 Bolen et al.
6,305,958 B1 * 10/2001 Maegawa et al. ........... 439/164
6,471,529 B2 * 10/2002 Oishi ......................... 439/164

FOREIGN PATENT DOCUMENTS

| JP | 2000336925 | * | 5/2002 |
| JP | 2002216923 A | * | 8/2002 |

OTHER PUBLICATIONS

U.S. Appl. No. 10/823,589 filed Apr. 14, 2004, Wade et al.
U.S. Appl. No. 10/823,558 filed Apr. 14, 2004, Wade et al.

* cited by examiner

*Primary Examiner*—Thanh-Tam Le
(74) *Attorney, Agent, or Firm*—Oblon, Spivak, McClelland, Maier & Neustadt, P.C.

(57) ABSTRACT

A rotary connector including a first part, a second part rotationally coupled to the first part to form an interior of the rotary connector, and an electrical cable housed within the interior of the rotary connector. An over current protection device is housed within an integral space of the rotary connector and configured to provide over current protection for the electrical cable.

16 Claims, 11 Drawing Sheets

SECTION A-A

ROTARY CONNECTOR HAVING AN INTEGRAL FUSE

BACKGROUND OF THE INVENTION

1. Field of the Invention

The present invention relates to a rotary connector, and particularly to a rotary connector having an alignment feature and/or an overcurrent protection feature.

2. Discussion of the Background

A rotary connector is used as a connector device for a flexible transmission medium that transfers electrical signals, optical signals, electric power, etc. between a stationary member and a rotating member rotating relatively to the stationary member within a limited range of rotational number. In this rotary connector, a flexible flat cable is housed in the form of a spiral connector within an annular space defined by a rotating case and a stationary case, which are combined for rotation. Alternatively, U.S. Pat. No. 5,310,356 assigned to The Furukawa Electric Co., Ltd discloses a flexible flat cable is housed in a rotary case in the form of stationary windings along the inside wall of the stationary member, then reversing direction via a U-shape turn, and continuing as rotating windings along the outside wall of the rotational member. The entire contents of U.S. Pat. No. 5,310,356 are incorporated herein by reference. Opposing ends of the flexible flat cable are connected to the rotating case and stationary case respectively, and the rotating case is allowed to rotate relatively to the stationary case as the flat cable is coiled and uncoiled simultaneously from the respective side walls of the rotary connector.

The rotary connector is typically required to be in a neutral position when mounted in a final assembly. The neutral position is usually a center position in the range of rotational movement of the rotary connector so that the rotary connector can be rotated the same number of rotations (i.e. angular rotational range) in both the clockwise and counterclockwise direction without damaging the flexible flat cable fixed to the stationary and rotary part of the rotary connector. That is, the neutral position allows the same number of functional rotations in either direction. In mounting the rotary connector in the steering apparatus of an automobile, for example, the steering wheel is adjusted to a straight-advance position as the neutral position connector is set into the steering apparatus. Thus, the steering wheel is free to operate the steering apparatus without causing a strain (or breaking) the flexible flat cable.

Because the rotary connector is provided as a subcomponent of a final assembly, such as a steering wheel assembly, the rotary connector is typically fixed in the neutral position until placed in the final assembly, where the rotary connector is made free to rotate in the assembly. Fixing in the neutral position is typically provided by a fixing pin having retaining hooks, called snap fits, that are removably mounted extending between mounting portions on the rotating and stationary cases, or by a seal that is pasted on both the cases. An example of a fixing mechanism is disclosed in U.S. Pat. No. 5,257,943, the entire content of which is incorporated herein by reference.

Conventional methods of fixing or sealing the rotary connector are problematic, however, in that it is difficult to verify that the connector is actually in the neutral position at the time of assembly. While the rotational and stationary part of the connector may have alignment marks that indicate the relative position of these parts when they are in the neutral position, because the rotational connector can make several complete rotations, the alignment marks may be aligned in positions other than the neutral position. Therefore, if the fixed or sealed neutral position is broken during transport of the rotary connector to the place of final assembly, for example, the neutral position cannot be found by using the alignment marks. Moreover, even if the fixed or sealed neutral position is not broken, it cannot be visually verified at final assembly that the rotary connector is actually in the alignment position corresponding to the neutral position.

Over current protection for the flexible flat cable has conventionally been provided by a fuse housed in a fuse box mounted on the final assembly such as a vehicle chassis. Such a fuse box is typically bulky and requires additional wiring from the rotary connector, which leads to additional material and assembly cost. Moreover, the fuse box may be accessible to an inexperienced user of the final assembly, which may lead to the wrong fuse being provided in the fuse box. Where the replaced fuse is rated lower than the proper fuse rating, premature blowing of the fuse may occur. More importantly, where the replaced fuse is rated higher than the proper fuse rating, excessive heat and even fire may result.

SUMMARY OF THE INVENTION

An object of the present invention is to mitigate any or all of the above-described problems.

Another object of the present invention is to provide a rotary connector that allows simple verification of a neutral position of the rotary connector.

Yet another object of the present invention is to provide a rotary connector having a simple and compact overcurrent protection feature.

These and other objects of the present invention are provided by a rotary connector including a first part, a second part rotationally coupled to the first part to form an interior of the rotary connector, and an electrical cable housed within the interior of the rotary connector. An over current protection device is housed within an integral space of the rotary connector and configured to provide over current protection for the electrical cable.

Another aspect of the invention is a steering wheel assembly including a first part, a second part rotationally coupled to the first part to form an interior of the rotary connector, and an electrical cable housed within the interior of the rotary connector. An over current protection device is housed within an integral space of the rotary connector and configured to provide over current protection for the electrical cable.

Yet another aspect of the invention is a rotary connector including a first part, a second part rotationally coupled to the first part to form an interior of the rotary connector, and an electrical cable housed within the interior of the rotary connector. The connector includes a means for protecting the electrical cable from over current, the means being housed within an integral space of the rotary connector.

Still another aspect of the invention includes A method of manufacturing a rotary connector. The method includes providing a first part rotationally coupled to a second part to form an interior of the rotary connector, providing an electrical cable housed within the interior of the rotary connector, and providing an over current protection device housed within an integral space of the rotary connector and configured to provide over current protection for the electrical cable.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
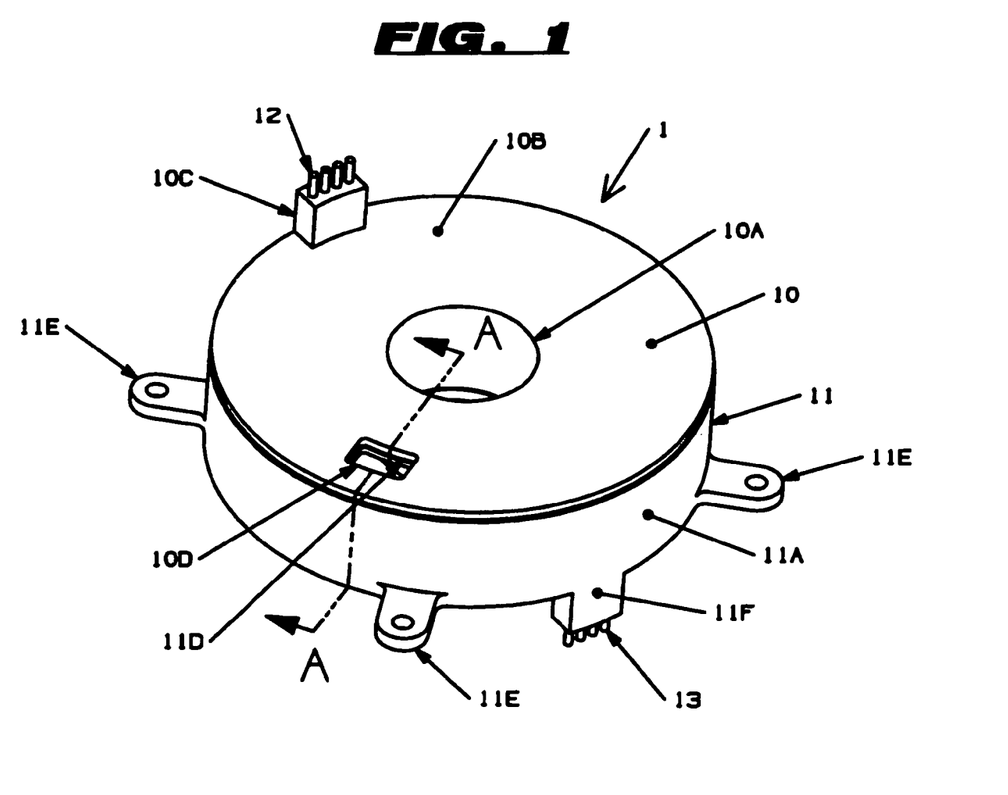
FIG. 1 is a perspective view of a rotary connector in accordance with one embodiment of the present invention.
Figure 2:
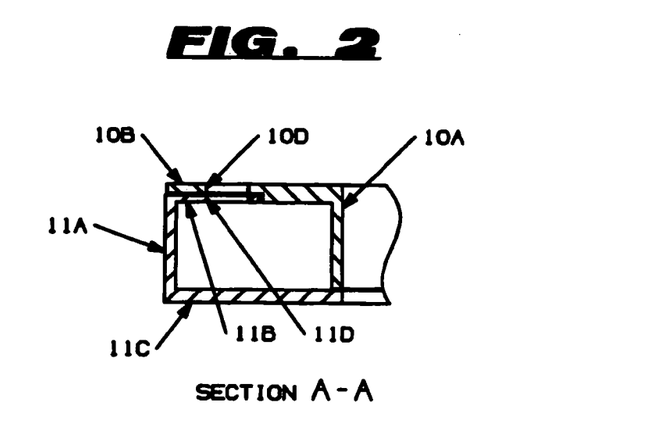
FIG. 2 is a partial cross-sectional view taken along line A—A of FIG. 1.

Referring now to the drawings, FIG. 1 is a perspective view of a rotary connector in accordance with one embodiment of the present invention, and FIG. 2 is a partial cross-sectional view taken along line A—A of FIG. 1. As seen in FIG. 1, the rotary connector 1 includes a rotating case 10 and a stationary case 11. The rotating case 10 includes an inner cylinder shaft portion 10a and an upper flange 10b. The upper flange 10b includes a rotating junction 10c, which provides electrical connection of a cable (not shown in FIG. 1) housed in the connector to an external electrical system. In the embodiment of FIG. 1, the rotating junction 10c includes wires 12, however pins may also be used. The upper flange 10b of the rotating case 10 further includes a through hole 10d positioned at a predetermined radial position on the upper flange 10b.

As best seen in FIG. 2, the stationary case 11 includes an outer cylinder wall 11a, an upper flange 11b and a lower flange 11c. The upper flange 11b is provided with a through hole 11d. The through hole 11d is positioned at substantially the same radial position as the through hole 10d so that these through holes overlap one another when rotated to the same angular position. Overlapping of the through holes 10d and 11d creates a window 1a that allows visual indication of a flexible flat cable within an annular space of the rotary connector 1 as will be further described below. Referring again to FIG. 1, the stationary case 11 includes a plurality of mounting flanges 11e arranged at suitable positions on the outer cylinder wall 11a for fixedly mounting the stationary case 11 on an assembly such as a vehicle-body. Also arranged on the outer cylinder wall 11a of the case 11 is a stationary junction 11f, which provides electrical connection of the cable housed in the rotary connector 1 to an external electrical system. In the embodiment of FIG. 1, the stationary junction 11f includes wires 13, however, pins may also be used.

Figure 3:
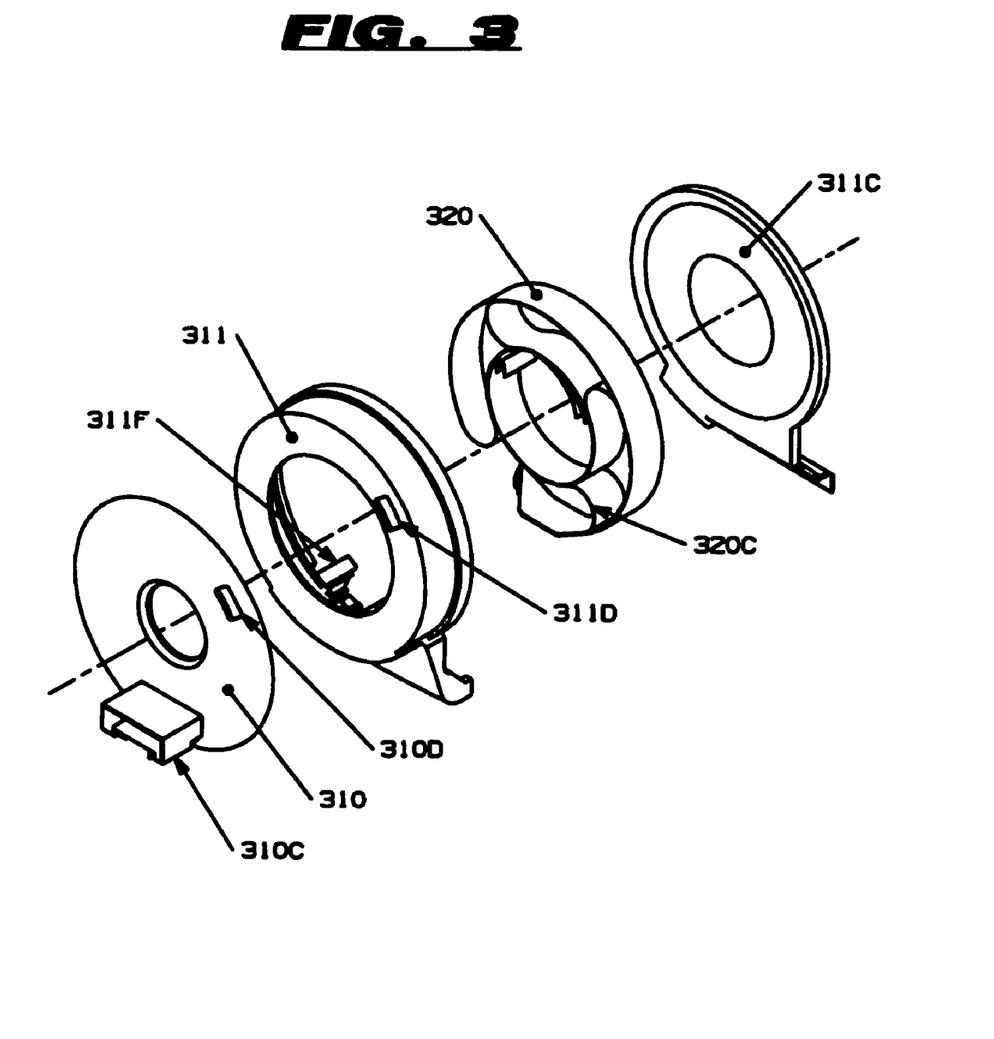
FIG. 3 is an exploded view of the rotary connector showing the interrelation of parts included in a rotary connector assembly according to one embodiment of the present invention.

FIG. 3 is an exploded view of the rotary connector showing the interrelation of parts included in a rotary connector assembly according to one embodiment of the present invention. As seen in this figure, the rotary connector assembly includes a rotating case 310, a stationary case 311, a flexible flat cable 320 and a separable stationary flange 311c. The rotating case 310 includes a rotating junction 310c and the stationary case 311 includes a stationary junction 311f. As seen in FIG. 3, the flexible flat cable 320 includes four separate flat cables bent to form U-shapes 320c. The stationary case 311 joins with the stationary flange 311c along the dashed assembly line in FIG. 3 to form an integral unit defining an annular space that the flexible flat cable 320 is contained in. The rotating case 310 is then rotationally coupled to the stationary case 311. As with the embodiment of FIGS. 1 and 2, the rotating case 310 and the stationary case 311 include a rotating through hole 310c and a stationary through hole 311d respectively. The through hole 311d is positioned at substantially the same radial position as the through hole 310c so that they overlap one another when rotated to the same angular position. While not shown in FIG. 3, in the final assembly of the rotary connector, one end of the flexible flat cable 320 is connected to the rotating junction 310c of the rotating case 310, and an opposing end of the cable 320 is connected to the stationary junction 311f of the stationary case 311.

Figure 4:
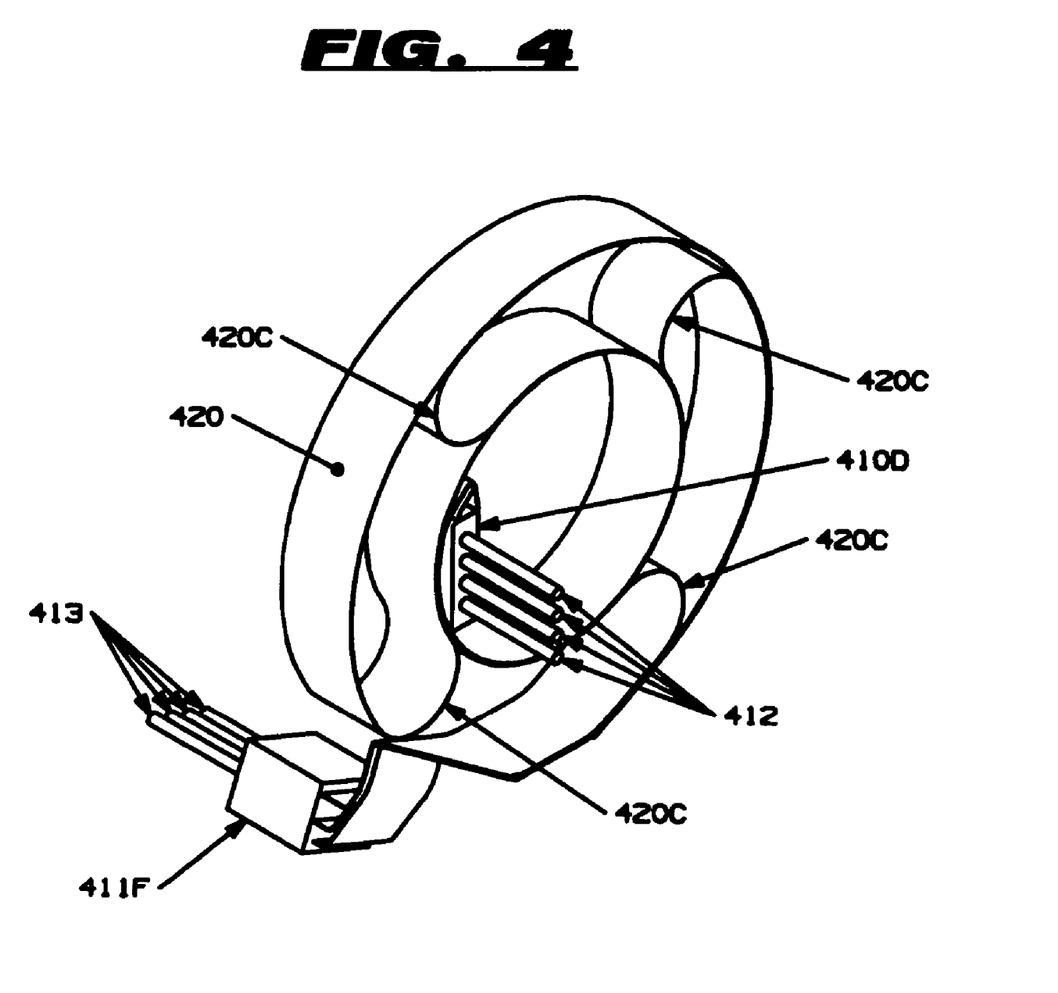
FIG. 4 is an illustration of a flexible flat cable assembly used with the a rotary connector in accordance with one embodiment of the present invention.

FIG. 4 is an illustration of a flexible flat cable assembly used with a rotational connector in accordance with one embodiment of the present invention. One end of the flexible flat cable 420 includes rotational junction 410d having male pins 412, while an opposing end of the flexible flat cable 420 includes stationary junction 411f having male wires or pins or wires 413. In the embodiment of FIG. 4, the male pins or wires 412 and 413 are suitable for connecting the flexible flat cable 420 to female electrical connectors of external wires. As with the embodiment of FIG. 3, the flexible flat cable 420 of FIG. 4 includes four flat wires that are housed within the annular space of the rotary connector. However, it is understood that the number of flat wires in the cable assembly may be changed depending on the electrical requirements of the assembly that the flexible flat cable is used with. Moreover, in one embodiment of the present invention, the rotary connector has a fixed number of flat wires, with a predetermined number of flat wires being electrically active based on the electrical requirements of the assembly, and remaining cables being "dummy cables" that act as spacers.

As seen in FIG. 4, the flat wires of the flexible flat cable 420 are housed such that each wire has some of its length wrapped around the inner cylinder shaft portion 10a of the rotating case 10 shown in FIG. 1, for example. Each wire of the flat cable 420 is then turned back upon itself to form a U-shape 420c so that the remainder of the flexible flat cable length is wound inside the outer cylinder wall 11a of the stationary case 11 in an opposite direction. The U-shape bend 420c of one of the flat wires of the flexible flat cable 420 acts as an indicator that the rotary cable is in a neutral position as will be further described below.

Figure 5:
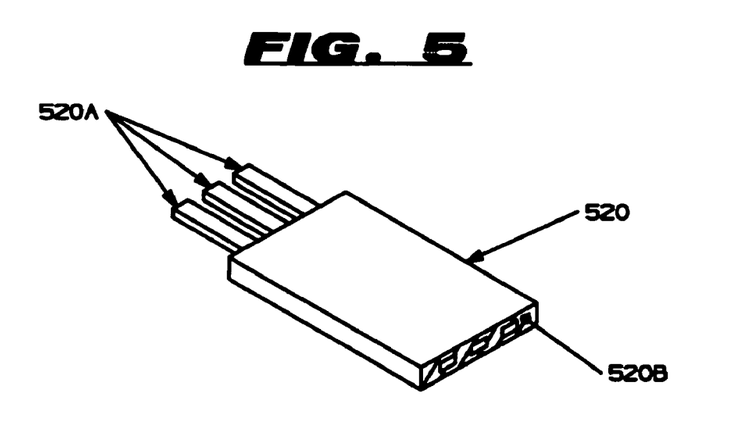
FIGS. 5–7 are illustrations showing various constructions of a flexible flat cable that may be used in accordance with the present invention.
Figure 6:
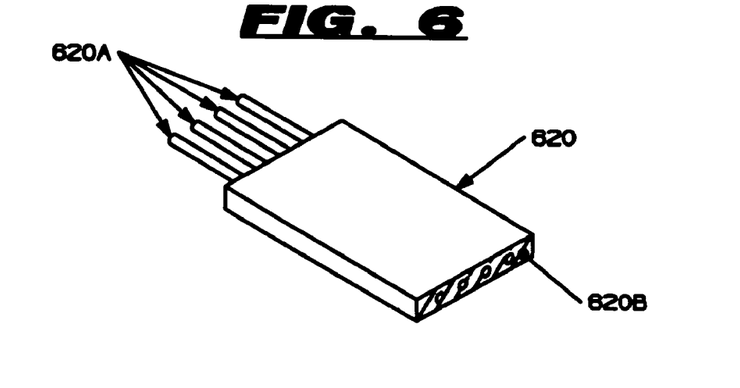
Figure 7:
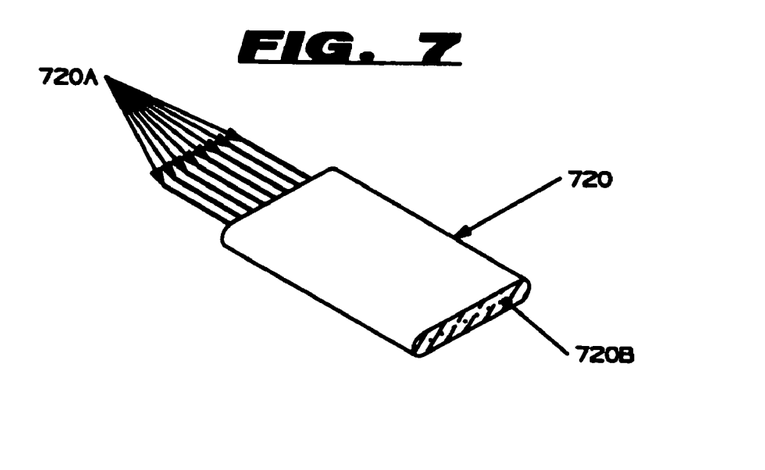

The flat cable of FIGS. 3 and 4 is a flexible belt-shaped transmission medium for transmitting electrical signals, optical signals, electric power, etc. As shown in FIG. 5, for example, the cable 520 is an electrical transmission medium that includes a plurality of flat rectangular electrical conductors 520a, arranged parallel to one another. In the embodiment of FIG. 5, an insulator 520b, such as a polyester film, covers the conductors 520a to electrically insulate them from one another. FIGS. 6 and 7 show alternative constructions of a flexible flat cable that may be used in accordance with the present invention. As seen in FIG. 6, a cable 620 is an electrical transmission medium that includes a plurality of electrical conductors 620a, having a circular cross section and arranged parallel to one another. An electrical insulation material 620b covers the conductors 620a. In FIG. 7, a flat cable 720 is a light transmission medium in the form of a tape fiber that includes a plurality of optical fibers 720a for transmitting optical signals. A covering material 720b covers the fibers 720a and provides a flexibility to the cable. Still alternatively, the flat cable may be a combination of an electrical transmission medium and a light transmission medium, in which case the cable includes electrical conductors and optical fibers covered by an insulation material. In one embodiment of the present invention, a single conductor ribbon wire may be used for the flexible flat cable, as will be described with respect to FIG. 10 below.

Figure 8A:
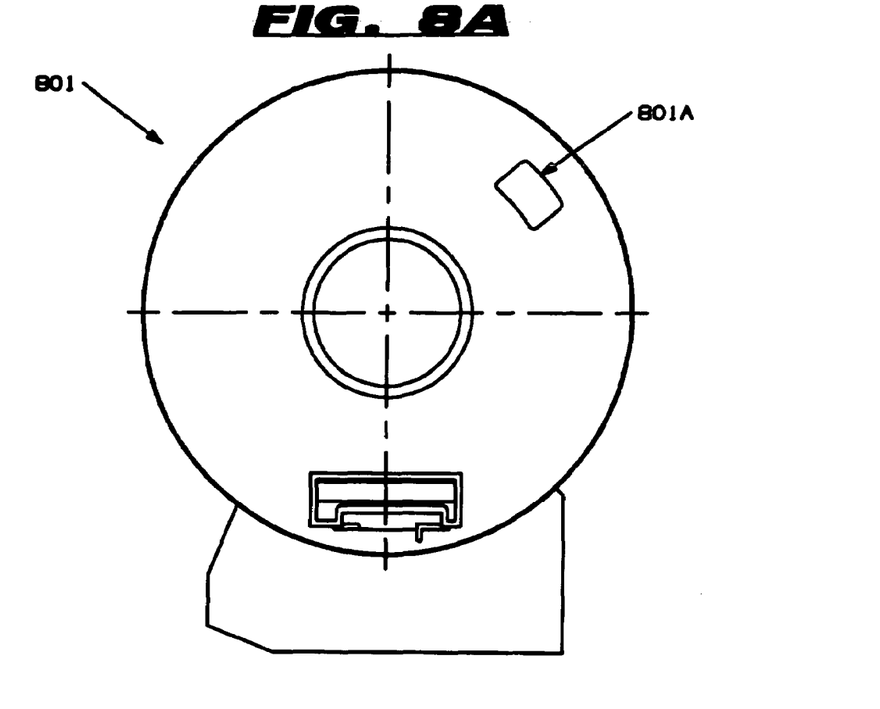
FIGS. 8a and 8b are front views of the rotary connector 1 that illustrate the use of viewing window and U-shaped bend 20c to indicate a neutral position of the rotary connector, in accordance with one embodiment of the present invention.
Figure 8B:
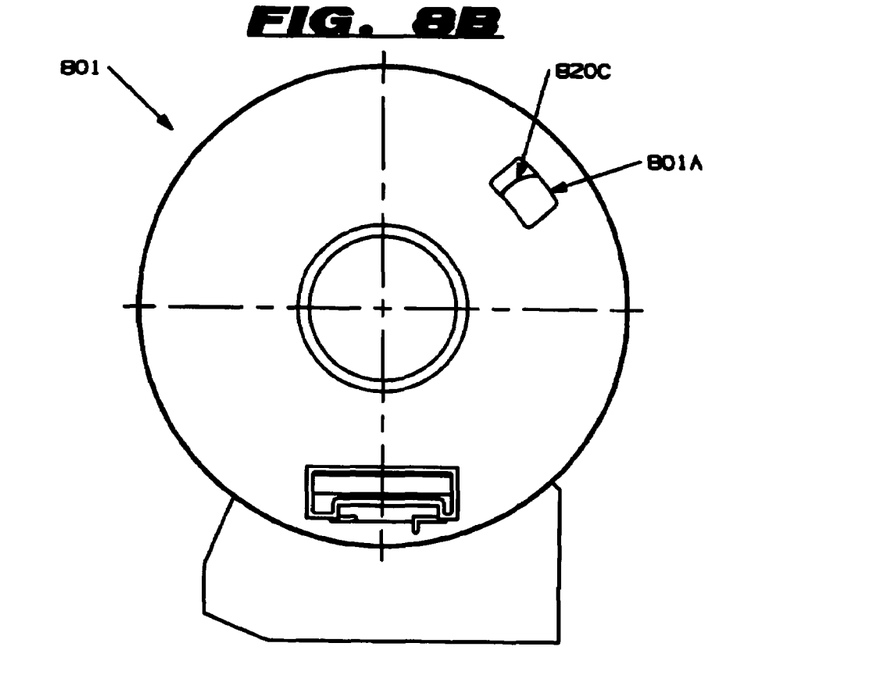

As noted above, viewing of the U-shaped bend of the flexible flat cable within the window provides an indication that the rotary connector is in a desired neutral position. FIGS. 8a and 8b are front views of a rotary connector 1 that illustrate the use of viewing window and the U-shaped bend to indicate a neutral position of the rotary connector, in accordance with one embodiment of the present invention. In FIGS. 8a and 8b, the rotary connector 801 is positioned such that the through hole of the rotating case overlaps the through hole of the stationary case to form viewing window 801a that allows viewing of the interior annular space of the rotary connector 801.

As seen in FIG. 8a, there is no flat cable bend visible within the viewing window 801a, which indicates that the rotary connector 801 is not in its neutral position. That is, the rotary case is in a position relative to the stationary case, other than the neutral position. While FIG. 8a shows no visibility of the flexible cable 820 in the window 1a, one of ordinary skill in the art would understand that a portion of the cable 20 other than the U-shaped bend 20c may be visible in the viewing window 801a. In such a situation an orientation of the cable 820 will make clear that the portion of the cable 820 in the window 801 is not the bend 820c, and therefore, the rotary connector is not in its neutral position. However, where the rotary case is rotated relative to the stationary case such that the U-shaped bend 820c is within the viewing window 801a, the rotary connector 801 is in the neutral position as shown in FIG. 8b.

Thus, according to the present invention, the rotating case 10 is in a neutral position relative to the stationary case 11 when the through holes 10d and 11d are aligned to form viewing window 1a, and one of the U-shaped bends 20c of the cable 20 is visible within the viewing window 1a. In order for the alignment of the viewing window 1a and the cable bend 20c to correspond to the neutral position, the through holes 10d and 11d must be positioned in a predetermined position on the rotary connector, and the length of the flexible flat cable 20 must correspond to the positioning of the viewing window 1a as well as the rotational range (i.e. the maximum number of turns or angular rotation) of the rotary connector. That is, where the rotary connector 1 has a rotational range of several turns, the viewing window will appear with each 360 degrees of rotation, but the length of the flexible flat cable 20 is selected such that a bend 20c will appear in the viewing window only when the connector is in the desired neutral position.

For example, in the embodiment of the present invention shown in FIG. 3, the flexible flat cable 320 is 805 mm long and the viewing window formed by the through holes 210d and 311d is located at approximately 2 o'clock when referenced to a clock face, if viewed from the vehicle driver's position in the case of an automobile application. With this configuration, the rotary connector will have a rotational range of approximately +/−2.5 turns and the cable bend 320c will appear in the viewing window at approximately 2.5 turns from each end of the functional rotational range. This identifies the functional center of the rotary connector and the neutral position. It is to be understood, however, that the present invention is not limited to this specific example, and the rotational range of the connector may be any number of turns with the desired neutral position being other than the functional center of the connector.

More specifically, in one embodiment of the present invention, the cable lengths $L_1$, $L_2$, $L_3$ and $L_4$ of the present invention have four progressively longer lengths. The cable lengths may be determined by the following calculations:

$$L_1 = \text{*length to make bus bar (rotor side)} + (2.5)(\pi)(d_r) + (0.5)(\pi)((d_s-d_r)/2) + (2.5)(\pi)(d_s) + \text{*length to make bus bar (stationary side)}.$$

$$L_2 = \text{*length to make bus bar (rotor side)} + (2.75)(\pi)(d_r) + (0.5)(\pi)((d_s-d_r)/2) + (2.75)(\pi)(d_s) + \text{*length to make bus bar (stationary side)}.$$

$$L_3 = \text{*length to make bus bar (rotor side)} + (3)(\pi)(d_r) + (0.5)(\pi)((d_s-d_r)/2) + (3)(\pi)(d_s) + \text{*length to make bus bar (stationary side)}.$$

$$L_4 = \text{*length to make bus bar (rotor side)} + (3.25)(\pi)(d_r) + (0.5)(\pi)((d_s-d_r)/2) + (3.25)(\pi)(d_s) + \text{*length to make bus bar (stationary side)}.$$

Where:
*length varies due to external design factors
$d_r$=outside diameter of rotational member
$d_s$=inside diameter of stationary member]

In addition, the calculation of cable lengths may account for the thickness of the cable. Referring to FIG. 4, the distance from the outer circle of the cables to the stationary junction 411f and the distance from the inner circle to the rotating junction 410d are the "lengths to make bus bar". These distances can vary from design to design and cannot be formulated as with the diameters.

Centering of the rotary connector to a neutral position will be described with respect to the rotary connector 1 shown in FIG. 1. Centering to the neutral position is preferably accomplished by turning the rotary case 10 in a clockwise direction. Rotation is complete when the rotary connector 1 has depleted the flat cable 20 windings along the inner wall 11a of the stationary case 11 and begins to pull at the junction 11f. The pulling of the flat cable 20, at the stationary junction 11f is readily discernable as the operating torque of the rotary connector 1 is very low (typically <0.1 Nm) and the end of travel for the flat cable 20 feels much like the rotary connector 1 has been snagged. Once the end of rotational travel has been established, the rotating case 10 is to be counter-rotated (2.5–3.0 turns in a preferred embodiment) until the through hole 10d of the rotating case 10 aligns with the through hole 11d of the stationary case 11, creating a centering window 1a. When the U-shape turn 20c of the flat cable 20 appears in the centering window 1a the rotary connector 1 is properly centered within its functional rotational limits, i.e. its neutral position.

In one embodiment of the present invention, the rotary connector may be provided with a fixing mechanism such as that described in U.S. Pat. No. 5,257,943, which is incorporated herein by reference. In accordance with the present invention however, if the fixing mechanism for fixing the rotary connector in a neutral position is broken during transport of the rotary connector to the final assembly, the neutral position can be easily found at the place of final assembly. Moreover, the fixing mechanism may be eliminated from the rotary connector to save material and assembly costs. Finally viewing the U-shaped bend at the flexible flat cable in the viewing window provides visual assurance at the final assembly that the rotary connector is actually in a neutral position.

In one embodiment of a rotary connector, the flexible cable within the connector may require overcurrent protection. As noted in the background section above, prior art rotary connectors provided such overcurrent protection by a fuse contained in a separate fuse box that was bulky and unsightly, and readily accessible to any user of the assembly that the rotary connector was applied to. The present inventors recognized that the need for housing the fuse in an external fuse box was due to space considerations within the rotary connector. More specifically, the present inventors discovered that the prior art use of multiple conductor flexible flat cables to provide high current capability required the use of multiple fuses to provide overcurrent protection of the cable.

Figure 9:
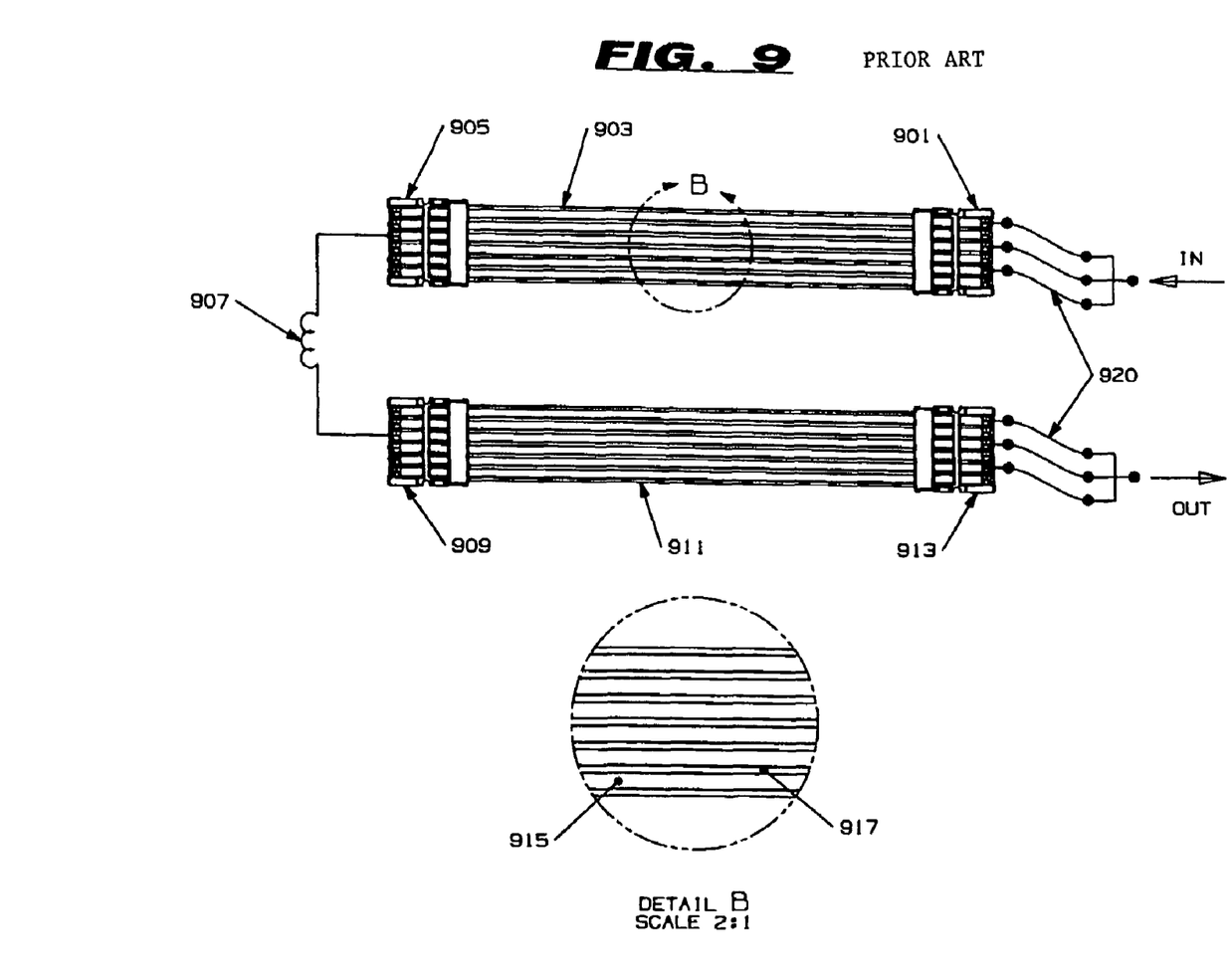
FIG. 9 shows a multiple conductor flexible flat cable used in prior art rotary connectors.

FIG. 9 shows a multiple conductor flexible flat cable typically used in prior art rotary connectors. As seen in this figure, the prior art cable includes input bus bar 901, input cable length 903, input bus bar 905, load 907, output bus bar 909, output cable length 911, and output bus bar 913. The input components, 901, 903 and 905 carry current to the load 907, and the output components 909, 911, and 913 carry current away from the load 907. For example, the input components may carry high current from chassis wires of an automobile to a resistive heating coil of a heated steering wheel in an automobile, while the output components provide current to return wires in the chassis of the automobile.

As seen in FIG. 9, each of the input length 903 and the output length 911 include six conductors 915 separated from one another by insulation strips 917. The input bus bar 905 and output bus bar 909 each provide a common electrical connection for the six conductors 915 of their respective connectors in order to provide high current to the load 907. However, the input bus bar 901 and the output bus bar 913 provide six discrete bonding pads for chassis wires that carry current to and from the flexible flat cable. As also seen in FIG. 9, use of the discrete bus bars 901 and 913 require six different fuses 920 to provide overcurrent protection for each of the six current paths providing current to the load 907. The present inventors recognized that this configuration results in inefficient use of space that prevents the overcurrent protection system of the flexible flat cable from being provided integral with the rotary connector.

Figure 10:
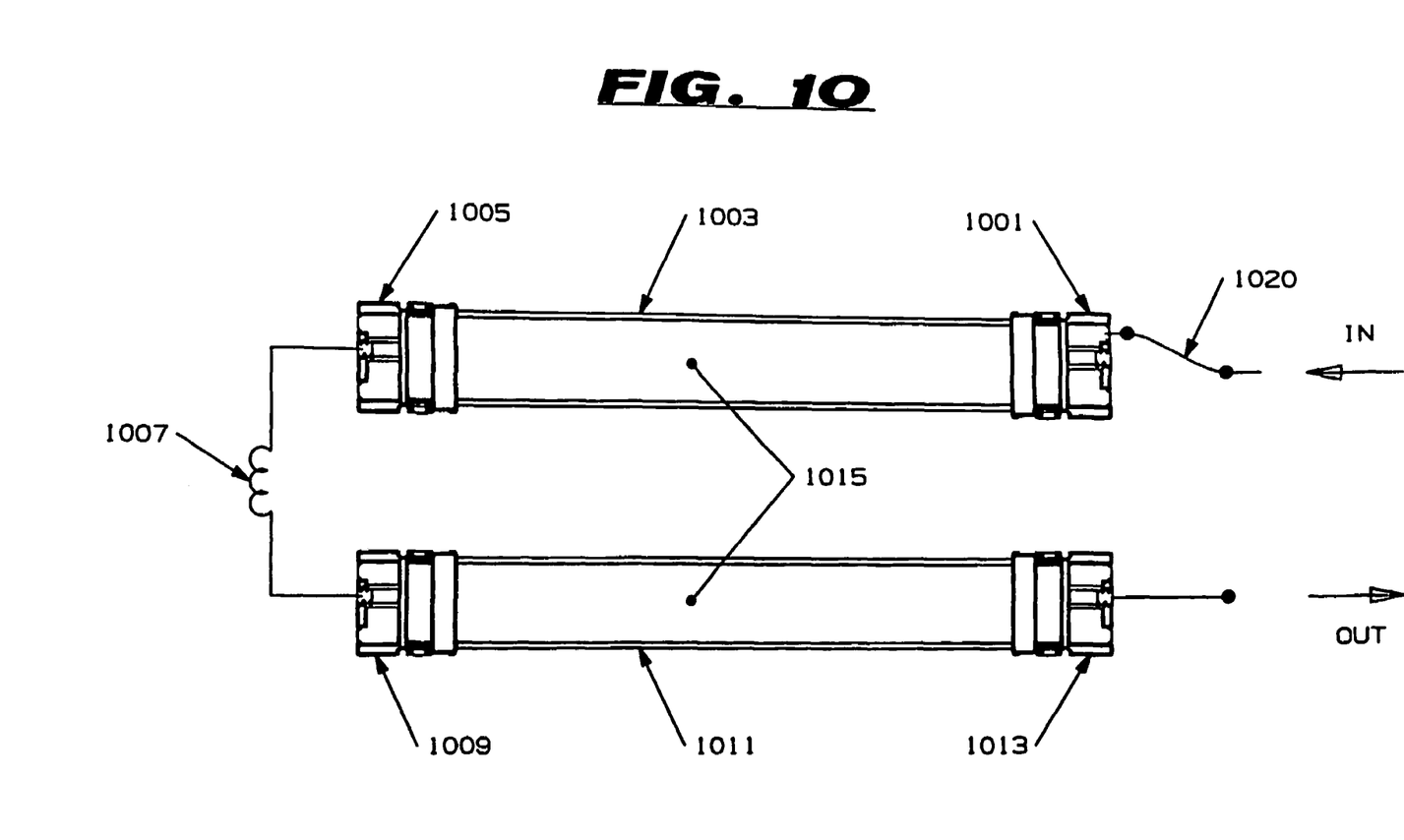
FIG. 10 shows a single ribbon flexible flat cable used in accordance with an embodiment of the present invention.

FIG. 10 shows a single ribbon flexible flat cable used in accordance with an embodiment of the present invention. As seen in this figure, the cable includes input bus bar 1001, input cable length 1003, input bus bar 1005, load 1007, output bus bar 1009, output cable length 1011, and output bus bar 1013. As with the prior art cable of FIG. 9, the input components, 1001, 1003 and 1005 carry current to the load 1007, and the output components 1009, 1011, and 1013 carry current away from the load 1007. However, as seen in FIG. 10, each of the input length 1003 and the output length 1011 includes a single ribbon conductor 1015 having a relatively large width for providing high current capacity. The single ribbon conductor is preferably made of copper, but any suitable conductor may be used. The ribbon conductors 1015 are coated with an insulating material such as a mylar sheet that electrically insulates and provides a flexibility for the cable lengths. Because the cable lengths 1003 and 1011 use a single ribbon conductor, each of the bus bars 1001, 1005, 1009, and 1013 are common electrical connection bus bars. Thus, as also seen in FIG. 10, a single fuse 1020 provides overcurrent protection for the flexible flat cable. The present inventors recognized that such use of a single fuse provides space efficiency that allows the overcurrent protection to be integrated within the rotary connector.

Figure 11:
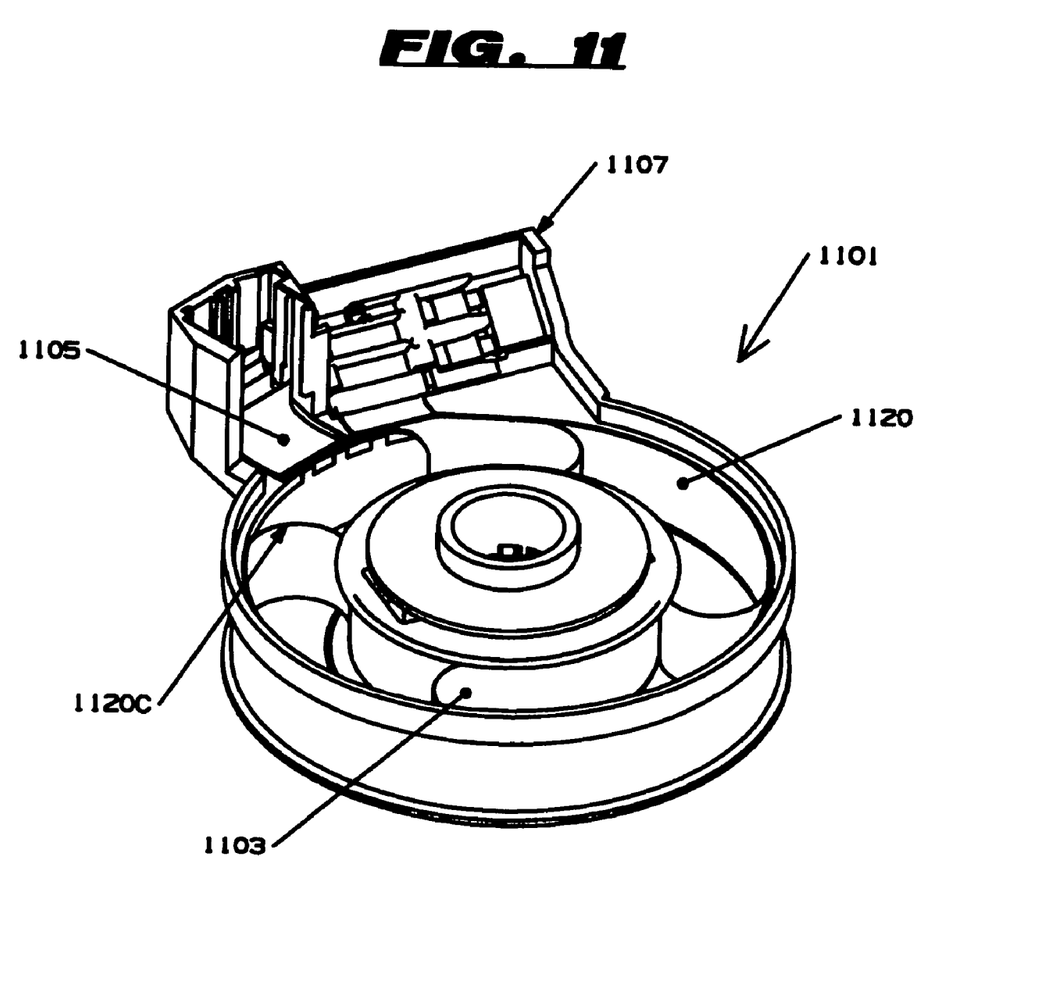
FIG. 11 is a drawing of a high current capable rotary connector having an integral blade fuse in accordance with one embodiment of the present invention.

FIG. 11 is a drawing of a high current capable rotary connector having an integral blade fuse in accordance with one embodiment of the present invention. As seen in FIG. 11, the rotary connector 1101 is shown without a cover to reveal the flexible flat cables housed within the annular space of the rotary connector 1101. The rotary connector 1101 includes a rotating case and a stationary case, combined for the purpose of housing flexible flat cable(s), similar to the rotary connectors previously described with respect to FIGS. 1 and 4. In the embodiment of FIG. 11, the flexible flat cable 1120 includes four flat w wires, two of which are single conductor ribbon wires, (1103 visible in FIG. 11) for providing input and output high current to the rotary connector 1101, with the two remaining ribbon wires being multiple conductor wires (1105 visible in FIG. 11) for providing separate current sources to the rotary connector 1101. While the flexible flat cable 1120 of FIG. 11 is shown to have U-shaped turns 1120c, such a configuration is not necessary to obtaining the advantages of the overcurrent fuse provided integral to the rotary connector 1101. For example, the flexible flat cable 1120 may be provided as a spiral, as described for prior art cables in the Background of the Invention section above.

The ribbon wires of the flexible cable 1120 are coated with a Mylar sheet and electrically connected with a bus-bar to the rotating and stationary mating terminations of the rotary connector. The Mylar sheet affords some structure to the flat cable and provides electrical insulation from adjacent flat cables. By design, these flat cables are incapable of handling currents exceeding a predetermined amperage (for example 8.0 Amps), so over-current protection is generally necessary. In FIG. 11, the over current protection is provided by a blade fuse 1107 mounted internal to the rotary connector 1101. The blade fuse 1107 is suitably rated for the size of the copper ribbon and preferably snaps into a recess in the rotary connector 1101 so as to be completely housed within the rotary connector 1101 when the connector is fully assembled.

Figure 12:
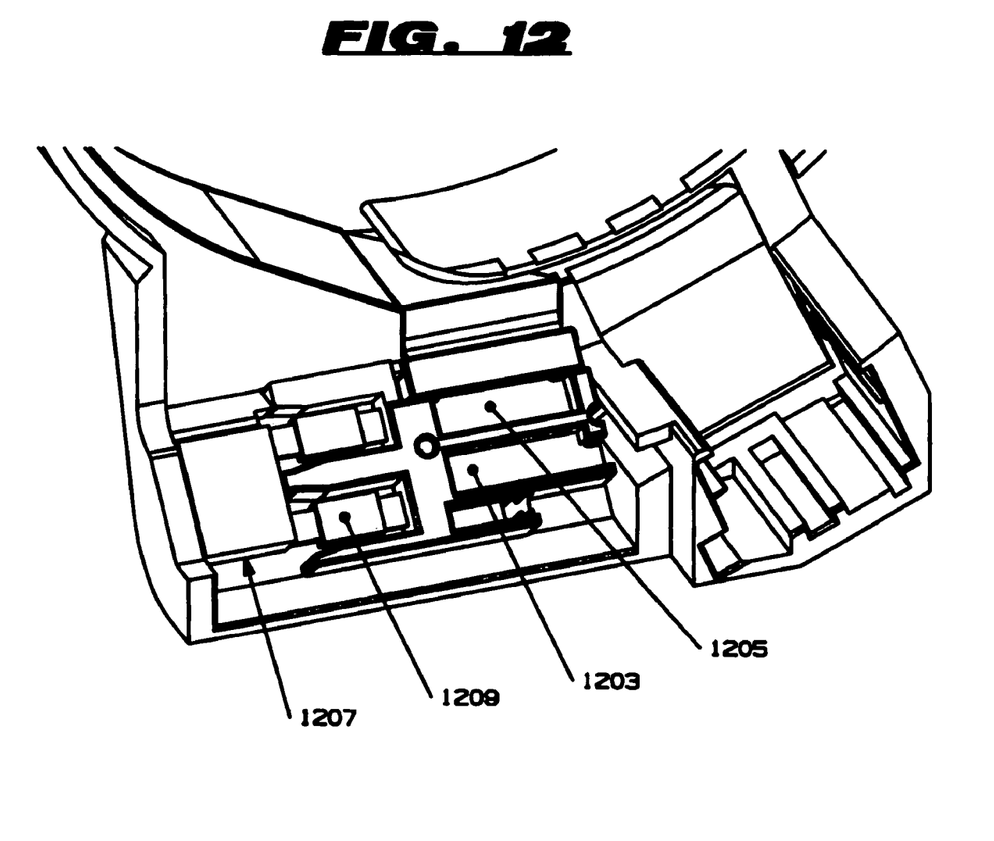
FIG. 12 is an enlarged drawing showing details of the blade fuse area of the rotary connector in accordance with one embodiment of the present invention.

FIG. 12 is an enlarged drawing showing details of a blade fuse area of a rotary connector in accordance with one embodiment of the present invention. As seen in this figure, the electrical bus-bar of the present invention is separated into two electrically insulated parts 1203 and 1205. Each insulated side 1203 and 1205 of the bus bar includes tangs (not shown) that protrude and provide a suitable docking feature for intermediate terminals 1209 which in turn provide a suitable docking feature the blade type fuse 1207. The bus-bar also serves as an intermediate terminal for electrically fixing the flexible flat cable to any external wires.

Figure 13A:
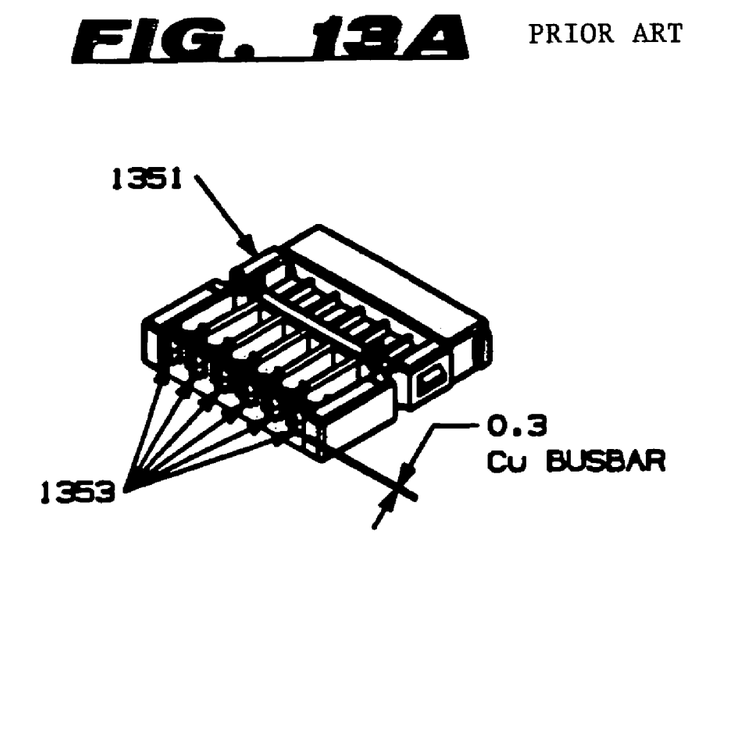
FIG. 13A is a drawing showing the configuration of a prior art bus bar assembly.

In addition to providing a fuse contained within the rotary connector, a bus bar assembly according to the present invention provides heat sinking features that improve the over current protection for the flexible flat cable of the rotary connector. FIG. 13A is a drawing showing the configuration of a prior art bus bar assembly. As seen in this figure, the prior art bus bar assembly of includes a housing 1351 and six discrete bonding pads 1353 for connecting discrete wires to the bus bar assembly as described with respect to FIG. 9 above. The bonding pads 1353 of the bus-bar assembly are fabricated using a nominal copper thickness of 0.3 mm appropriate for ultra sonic welding of the flexible flat cable and round wire to the bus bar. The present inventors have recognized that this configuration of the prior art bus bar assembly provides little ability to sink away excess heat created by high current electrical loads, thus potentially blowing the fuse prematurely.

Figure 13B:
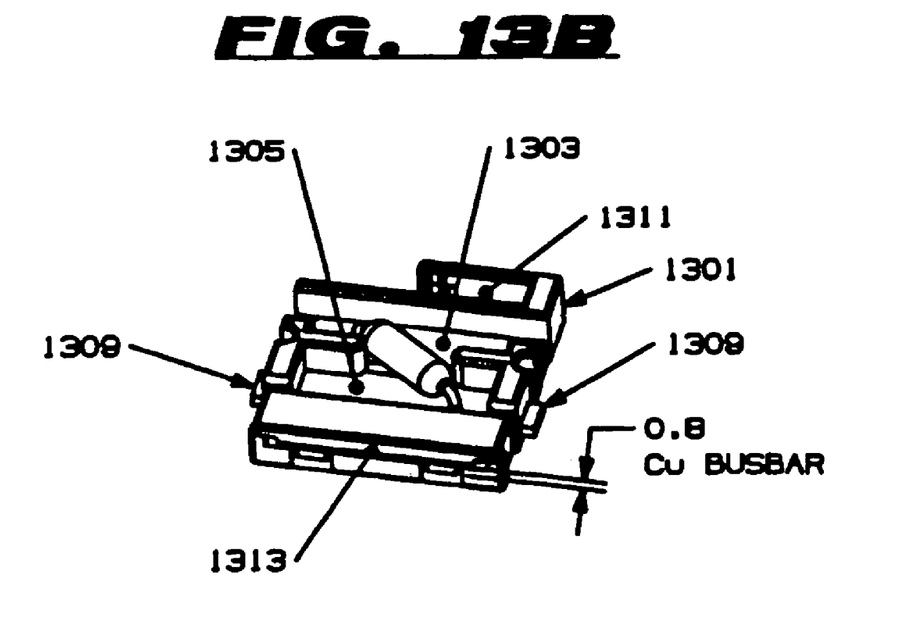
FIG. 13B is a drawing showing the configuration of a bus bar assembly in accordance with an embodiment of the present invention.

FIG. 13B is a drawing showing the configuration of a bus bar assembly in accordance with an embodiment of the present invention. As seen in this figure, the bus bar assembly includes a housing 1301, and parts 1303 and 1305 physically separated and electrically insulated from one another. While not shown in FIG. 13A, the parts 1303 and 1305 are electrically connected to one another by a fuse device that provides over current protection for the rotary cable assembly. As shown in FIG. 13B, the bus-bar parts 1303 and 1305 are fabricated using extra thick copper of 0.8 mm, which sinks away some of the heat created from high electrical loads, thus avoiding premature fuse blow. Moreover, the housing 1301 of the bus bar assembly includes sink fins 1309 that sink away some of the heat created from high current electrical loads, thus avoiding premature fuse blow. While not shown in FIG. 13B, the housing 1301 may also include a cooling pipe for heat sinking. In the embodiment of FIG. 13B, the housing 1301 includes a wire recess 1311 for holding an input round wire, such as a chassis wire of an automobile, to the bus bar assembly, and a bus bar connector portion 1313 for connecting to a connector end of the flexible flat cable of the rotary connector.

Figure 14:
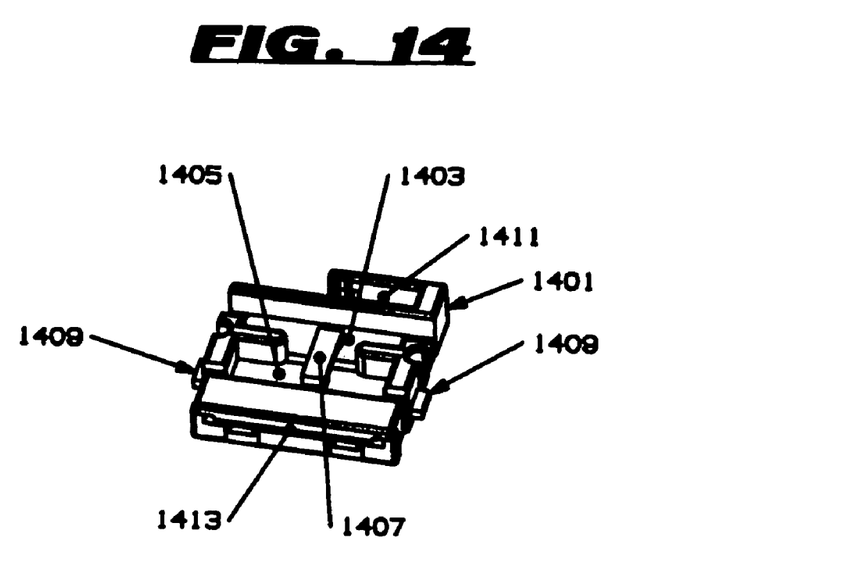
FIG. 14 is a drawing showing a detailed configuration of a bus bar assembly having a surface mount fuse in accordance with one embodiment of the present invention.
Figure 15:
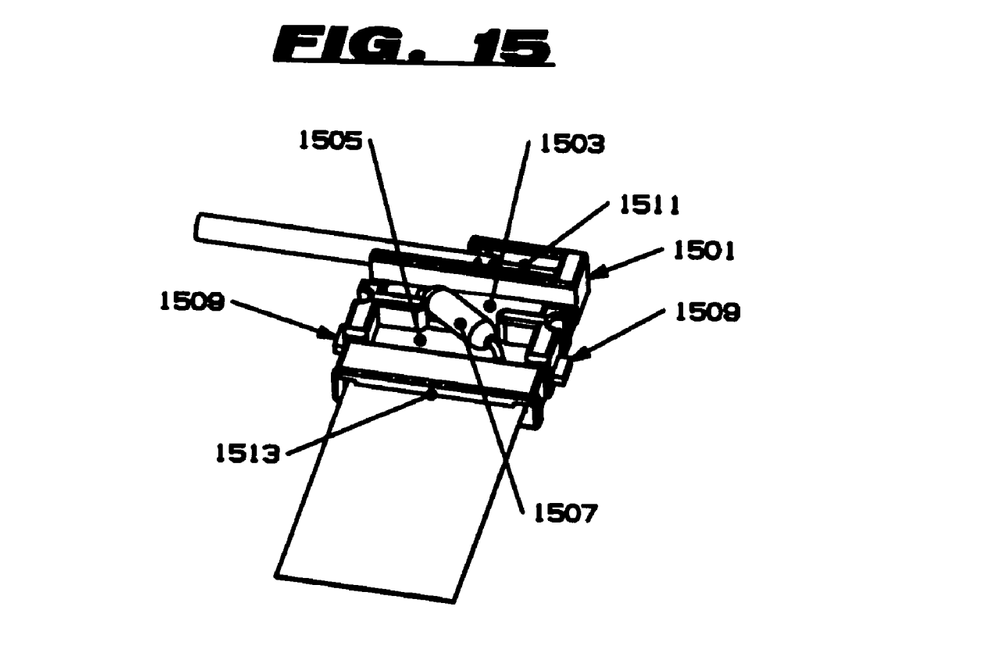
FIG. 15 is a drawing showing a detailed configuration of a bus bar assembly having a Pico fuse in accordance with one embodiment of the present.

FIG. 14 is a drawing showing a detailed configuration of a bus bar assembly having a surface mount fuse in accordance with one embodiment of the present invention. As with the bus bar described in FIG. 12, the bus bar includes a housing 1401 and electrically insulated parts 1403 and 1405. The parts 1403 and 1405 are electrically connected by surface mount fuse 1407. In addition, the bus bar assembly includes heating fins 1409 and increased thickness copper. The bus bar and fuse assembly also includes a round wire recess 1411 for holding an input wire to the bus bar assembly, and a bus bar connector portion 1413 for connecting to a connector end of the flexible flat cable of the rotary connector. FIG. 15 is a drawing showing a detailed configuration of a bus bar assembly having a Pico fuse in accordance with one embodiment of the present. As with the embodiments previously described, the bus bar assembly includes a housing 1501 and electrically insulated parts 1503 and 1505. In the embodiment of FIG. 15, each insulated side of the bus bar 1503 and 1505 has a hole that provides typical mounting for Pico fuse 1507, which electrically connects the parts 1503 and 1505. The bus bar assembly of FIG. 15 also includes heating fins 1509 and increased thickness copper. FIG. 15 also shows an electrical wire fixed in the wire recess 1509, and a ribbon cable fixed to the bus bar connector portion 1511.

Thus, a rotary connector of the present invention houses a fused devise for purpose protecting vulnerable flexible flat cables from over-current loading. The fused device is preferably housed within the connector in a more overall compact design of the rotary connector. Moreover, the fused device is preferably housed within the connector such a way as to not permit replacement of the fuse so that the rotary connector is provided as a replacement unit. However, an embodiment of the invention may include a fuse provided integral to the rotary connector and readily removable for replacement by any user, or by use of special purpose tooling that is generally available only to experienced maintenance persons.

Obviously, numerous modifications and variations of the present invention are possible in light of the above teachings. It is therefore to be understood that within the scope of the appended claims, the invention may be practiced otherwise than as specifically described herein.

The invention claimed is:

1. A rotary connector comprising:
    a first part;
    a second part rotationally coupled to said first part to form an interior of the rotary connector;
    a first flat cable having only a single ribbon conductor which has a relatively large width for providing input and output high current to the rotary connector;
    a second flat cable for providing separate current sources to the rotary connector, wherein the second flat cable has multiple conductor wires, wherein said first and second flat cables are wholly housed within said interior of the rotary connector and each of said first and second flat cables extend in a circumferential direction about an axis of rotation of the rotary connector; and
    an over current protection device housed within an integral space of said rotary connector and configured to provide over current protection for at least one of the first and second flat cables; and
    a bus bar coupled to said first flat cable, said over current protection being integrated with said bus bar, wherein the bus bar comprises:
        a first conductor electrically connected to said first flat cable; and
        a second conductor electrically insulated from said first conductor and configured to be connected to a power input to said rotary connector, wherein said over current protection device is electrically connected to said first conductor.

2. The rotary connector of claim 1, wherein said over current protection device consists of a single fuse configured to provide over current protection for said at least one of the first and second flat cables.

3. The rotary connector of claim 1, wherein said integral space comprises a recess formed in said interior of the rotary connector.

4. The rotary connector of claim 3, wherein said recess is separate from an annular space in said interior used to house the first and second flat cables.

5. The rotary connector of claim 3, wherein said over current protection device snaps into said recess.

6. The rotary connector of claim 1, wherein said over current protection consists of a single fuse configured to provide over current protection for said at least one of the first and second flat cables.

7. The rotary connector of claim 1, wherein said over current protection device comprises a blade fuse, said rotary connector further comprising a intermediate terminals connected to said first and second conductors and configured to electrically connect with said blade fuse.

8. The rotary connector of claim 7, wherein said over current protection device comprises a pico fuse.

9. The rotary connector of claim 1, wherein said over current protection device comprises a surface mount chip fuse.

10. The rotary connector of claim 1, further comprising a heat sink feature configured to remove heat from the bus bar.

11. The rotary connector of claim 10, wherein said heat sink feature comprises 0.8 mm thick copper contacts used for said first and second conductors.

12. The rotary connector of claim 10, wherein said heat sink feature comprises sink fins.

13. The rotary connector of claim 10, wherein said heat sink feature comprises a heat pipe.

14. The rotary connector according to claim 1, wherein the at least one of the first and second flat cables provided with over current protection is said first flat cable, which is configured to provide input and output high current to the rotary connector.

15. The rotary connector of claim 1, wherein each of the first and second flat cables comprises an input cable length and an output cable length.

16. The rotary connector of claim 1, wherein at least one of the first and second flat cables comprises a plurality of flat cables.

* * * * *